United States Patent [19]

Cohrs et al.

[11] Patent Number: 4,996,869

[45] Date of Patent: Mar. 5, 1991

[54] SYSTEM FOR SELECTING VALID K-FACTOR DATA POINTS BASED UPON SELECTED CRITERIA

[75] Inventors: Gary D. Cohrs, Tempe; Samuel H. Smith, Phoenix; Edward E. Francisco, Jr., Paradise Valley, all of Ariz.

[73] Assignee: EG&G Flow Technology, Inc., Phoenix, Ariz.

[21] Appl. No.: 271,090

[22] Filed: Nov. 14, 1988

Related U.S. Application Data

[63] Continuation-in-part of Ser. No. 862,247, May 12, 1986, abandoned.

[51] Int. Cl.⁵ .............................................. G01F 23/00
[52] U.S. Cl. ........................................ 73/3; 364/571.05
[58] Field of Search ..... 73/3; 364/510, 571.01–571.08

[56] References Cited

U.S. PATENT DOCUMENTS

| Re. 31,432 | 11/1983 | Francisco | 73/3 |
|---|---|---|---|
| 3,403,544 | 10/1968 | Francisco, Jr. | 73/3 |
| 3,492,856 | 2/1970 | Francisco, Jr. | 73/3 |
| 3,711,689 | 1/1973 | Park | 235/151.34 |
| 3,823,310 | 7/1974 | Kalotay et al. | 235/151.34 |
| 3,936,663 | 2/1976 | Taylor et al. | 364/510 X |
| 4,152,922 | 5/1979 | Francisco, Jr. | 73/3 |
| 4,264,955 | 4/1981 | Goodwin | 364/510 |
| 4,627,267 | 12/1986 | Cohrs et al. | 73/3 |
| 4,637,244 | 1/1987 | Maurer et al. | 73/3 |
| 4,674,317 | 6/1987 | Cohrs | 73/3 |
| 4,953,386 | 9/1970 | Pearman et al. | 73/3 |

FOREIGN PATENT DOCUMENTS

| 1498424 | 7/1970 | Fed. Rep. of Germany . | |
| 198870 | 12/1982 | Japan | 73/3 |
| 84/02185 | 6/1984 | PCT Int'l Appl. . | |
| 87/00622 | 1/1987 | PCT Int'l Appl. . | |
| 87/07017 | 11/1987 | PCT Int'l Appl. . | |

OTHER PUBLICATIONS

Ward, P. A., "Liquid Flowmeter Prover", *ISA Transactions*, vol. 24, No. 3, 1985, pp. 83–91.

Bellinga, H. et al., "Piston Prover Used to Calibrate Gas Meters", Oil & Gas Journal, vol. 83, No. 33, Aug. 1985, pp. 89, 92, 97, 98, 100, & 102 (apparently complete).

"Fast Calibration of Gas Flowmeters", *NASA Tech. Briefs*, vol. 5, No. 4, pp. 426–477; Winter, 1981 (by Mar. 1981), R. V. Lyle, et al. of John F. Kennedy Space Center, Fla.

*Primary Examiner*—Tom Noland
*Attorney, Agent, or Firm*—Christie, Parker & Hale

[57] ABSTRACT

A moveable fluid barrier (16) is driven from an upstream position to a downstream position through a measuring cylinder (18) connected fluidically in series with the flowmeter (22) under test to induce fluid flow therethrough at a flow rate related to the movement of the barrier. The response of the flowmeter is sensed during a plurality of time intervals as the barrier is driven through the conduit from the upstream position toward the downstream position in the course of a test run. The movement of the fluid barrier is also sensed (28) during these intervals. From the flowmeter response and the fluid barrier movement, a K-factor sample is determined for each interval. The K-factor samples are compared (12) with each other to selected a valid K-factor data point for the particular test run. Specifically, the criterion for determining a valid K-factor data point is the variation between K-factor samples under comparison.

3 Claims, 1 Drawing Sheet

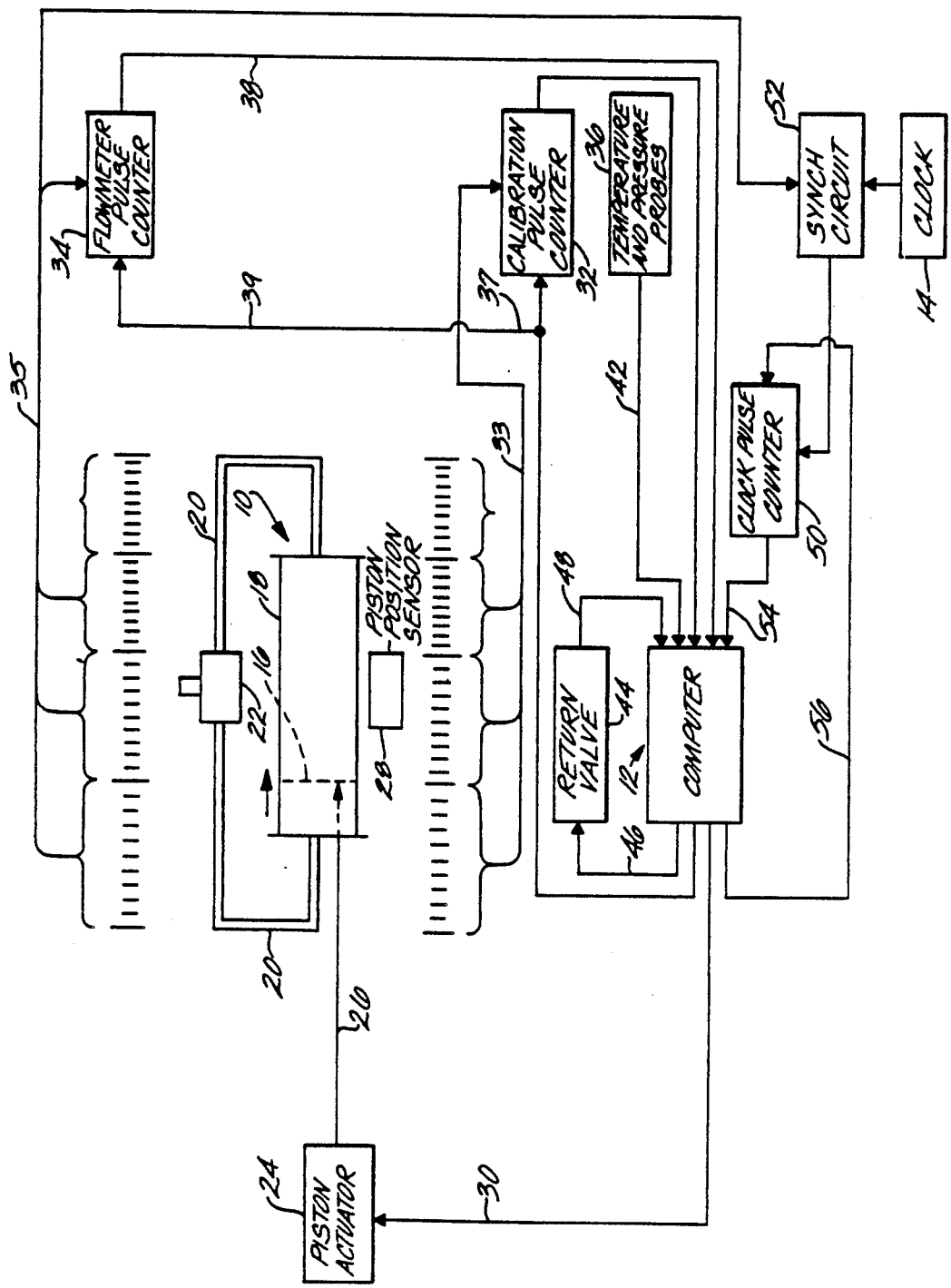

SYSTEM FOR SELECTING VALID K-FACTOR DATA POINTS BASED UPON SELECTED CRITERIA

This application is a continuation-in-part of International Application Ser. No. PCT/US87/01104, filed May 12, 1987, published Nov. 19, 1987 as WO87/07017, and U.S. application Ser. No. 06/862,247, filed May 12, 1986, now abandoned.

The specification incorporates a microfiche Appendix A, comprising a total number of 6 microfiche and a total number of 565 frames.

BACKGROUND OF THE INVENTION

This invention relates to flowmeter calibration and, more particularly, to a method for determining the K-factor of a flowmeter with a prover or calibrator.

In order to obtain accurate readings from a flowmeter, it must be calibrated from time to time by determining its characteristic, i.e., the constant of proportionality between the flow rate of the fluid flowing through the flowmeter and the response given by the flowmeter, sometimes called the K-factor of the flowmeter. In the case of a turbine type flowmeter that develops electrical oscillations proportional in number to the volume of flow through the flowmeter, the K-factor is expressed in terms of the number of pulses generated by the flowmeter per unit volume of fluid passing therethrough. Apparatus to determine the K-factor with the flowmeter in an operating fluid system is called a prover. Apparatus to determine the K-factor with the flowmeter in a self-contained testing system, i.e., not in an operating fluid system, is called a calibrator.

My U.S. Pat. No. 4,152,922 discloses a small-volume prover that employs mechanical volume displacement techniques. The prover has a measuring piston that travels through a measuring cylinder as a fluid barrier in synchronism with fluid passing through the operating fluid system that includes the flowmeter under test. A rod connects the measuring piston to a fluidically actuated control piston in a control cylinder which serves to hold the measuring piston at the upstream end of the measuring cylinder between test runs and return the measuring piston to the upstream end of the measuring cylinder after each test run.

The K-factor of a flowmeter varies as a function of the flow rate and the fluid characteristics such as viscosity, density, temperature and pressure. Thus, many test runs of the calibrator or prover must be made to derive the K-factor as a function of all the variables that the flowmeter may encounter. As a result of this consideration, speed and automation of the calibrator or prover operation are important factors. Another important factor is the capacity of the calibrator or prover, i.e., the fluid volume it can displace during a test run. The higher the capacity, the more accurate and repeatable is the determination of the K-factor. On the other hand, the cost of manufacture and space requirements go up as the capacity increases.

Small volume calibrators and provers generally use one of two techniques to generate K-factor data. The one technique, now commonly called dual chronometry, is described in Francisco U.S. Pat. No. 3,403,544, which issued on Oct. 1, 1968. A fixed volume of fluid is displaced by the measuring piston of the calibrator or prover during data acquisition in each test run. This fixed volume is determined by the placement of two piston sensors to measure the time interval between which the measuring piston travels from an upstream position to a downstream position. The sensors must be spaced sufficiently far from the upstream end of the cylinder through which the measuring piston travels so the measuring piston is up to full speed as it passes the upstream sensor. The sensors must also be spaced apart sufficiently to average out steady state flow perturbations. The apparatus cannot easily handle a wide range of flow rates and fluid characteristics without repositioning the piston sensors, which requires the performance of a time consuming water draw operation.

The other technique permits the volume of fluid displaced during data acquisition in each test run to be varied according to the flow rate and fluid characteristics. As disclosed in Francisco U.S. Pat. No. 3,492,856, which issued Feb. 3, 1970, an encoder generates a signal representative of the piston position throughout measuring cylinder travel with high resolution. The encoder can be a rotary electrical encoder or a linear optical encoder. The piston position at the start of data acquisition and the displaced volume during data acquisition can be selected to provide the most accurate and reliable K-factor data, depending upon the flow rate and fluid characteristics. This selection seeks to make the best compromise of the following countervailing considerations: the further downstream the piston is, when data acquisition begins, the more assurance there is that the measuring piston is up to full speed, but the less opportunity there is to average out steady state perturbations in the flow rate during data acquisition.

SUMMARY OF THE INVENTION

The invention is directed to a method for determining the K-factor of a flowmeter using mechanical volume displacement techniques in a rapid automated manner with a small volume displacement. A moveable fluid barrier is driven from an upstream position to a downstream position through a measuring cylinder connected fluidically in series with the flowmeter under test to induce fluid flow therethrough at a flow rate related to the movement of the barrier. The response of the flowmeter is sensed during a plurality of time intervals as the barrier is driven through the conduit from the upstream position toward the downstream position in the course of a test run. The movement of the fluid barrier is also sensed during these intervals. From the flowmeter response and the fluid barrier movement, a K-factor sample is determined for each interval. The K-factor samples are compared with each other to select a valid K-factor data point for the particular test run. Specifically, the criterion for determining a valid K-factor data point is the variation between K-factor samples under comparison. For example, when the variation between successive samples is less than a predetermined amount, these samples can be denominated as a valid K-factor data point. By generating a plurality of K-factor samples during each measuring piston run, it is possible more easily to determine from such samples when the measuring piston is traveling at full speed and to derive the K-factor from data acquired only thereafter. The more intervals there are, the better it can be ascertained when the measuring piston is up to speed, but the less is the ability to average out steady state perturbations.

A feature of the invention is the ability to vary the duration of the intervals and therefore the induced fluid flow volume during which each K-factor sample is taken. Thus, depending upon the flow rate and fluid characteristics, intervals can be selected that will best reconcile the ability to average steady state perturbations, which results from large intervals, with the ability better to develop K-factor samples only after the measuring piston has reached full speed, which results from small intervals.

BRIEF DESCRIPTION OF THE DRAWING

The features of a specific embodiment of the best mode contemplated of carrying out the invention are illustrated in the drawing, the single feature of which is a schematic block diagram illustrating how the invention is practiced.

DETAILED DESCRIPTION OF THE SPECIFIC EMBODIMENT

In the drawing are shown a mechanical volume positive displacement calibrator 10, a digital computer 12 and a clock 14 for measuring time intervals during operation of calibrator 10 and computer 12. The preferred embodiment of calibrator 10 is depicted in FIG. 3 of U.S. Pat. No. 4,627,267. The referenced patent is assigned to the assignee of this application. Calibrator 10 has a fluid barrier in the form of a measuring piston 16, represented by a dashed line, which is adapted to travel through a measuring conduit or cylinder 18 from end to end. Measuring cylinder 18 has an inlet at one end and an outlet at the other end connected externally by a fluid line 20. A flowmeter 22 to be calibrated, such as a turbine meter, is connected in fluid line 20. Flowmeter 22 generates pulses related in frequency to the flow rate of the fluid passing therethrough and thus provides a measure of such flow rate. A piston actuator 24, is connected by a rod represented at 26 to piston 16 within cylinder 18. Piston actuator 24 could comprise a hydraulic actuator as described in connection with FIG. 1 of the referenced patent or a threaded shaft driven by an electric motor as described in connection with FIG. 3 of the referenced patent. A piston position sensor 28, which could comprise a linear optical encoder as described in connection with FIG. 1 of the referenced patent or a rotary electrical encoder as described in connection with FIG. 3 of the referenced patent, generates pulses proportional in number to the displacement of piston 16 within cylinder 18. Typically, the resolution of the generated pulses is quite high, e.g. on the order of 2,500,000 pulses per actual cubic meter of gas flow through measuring cylinder 18.

In operation, computer 12 sends a start command to piston actuator 24 via an electrical connection 30. Actuator 24 drives piston 16 from the upstream end of cylinder 18 to the downstream end thereof. Piston 16 serves as a fluid barrier which prevents fluid flow from one side thereof to the other. Thus, cylinder 18 is connected fluidically in series with flowmeter 22 to induce fluid flow through flowmeter 22 at a flow rate directly proportional to the movement of piston 16. As piston 16 travels downstream through cylinder 18, its movement is sensed by a calibrator pulse counter 32 via an electrical connection 33 from position sensor 28. The output of counter 32 is connected to the input of computer 12. Computer 12 controls the operation of counters 32, 34, and 50 via electrical connections 37, 39 and 56, respectively. The output of flowmeter 22 is connected via an electrical connection 35 to a flowmeter pulse counter 34, which senses the response of flowmeter 22 as piston 16 travels downstream through cylinder 18. The output of counter 34 is connected to the input of computer 12. The spaced apart lines above flowmeter 22 and below piston position sensor 28 represent the pulses that are generated thereby. The pulses from clock 14 are registered by a counter 50. A synch circuit 52 synchronizes the operation of counter to the flowmeter pulses so that counter 50 begins registering clock pulses at the same point, for example the leading edge of each flowmeter pulse. The output of counter 50 is connected to the input of computer 12 via an electrical connection 54.

Computer 12 calculates K-factor samples from the data acquired by counters 32 and 34 at predetermined time intervals represented by the brackets above flowmeter 22 and below piston position sensor 28. The time intervals can be determined in any number of ways. For maximum accuracy an important consideration is that corresponding time intervals for flowmeter 22 and piston position sensor 28 coincide exactly with each other. In the preferred embodiment disclosed herein, these time intervals are determined by the number of pulses generated by flowmeter 22. For example, the time interval could be set for approximately 2,000 flowmeter pulses, in which case, as soon after each increment of 2,000 pulses is registered by counter 34 as computer 12 can respond to this condition, the count registered by counters 32 and 34 are fed to computer 12 and a K-factor sample is calculated. (It should be noted that the time intervals become shorter as the measuring piston approaches full speed.) Specifically, the meter frequency, F, is calculated by dividing the number of flowmeter pulses registered by counter 34 by the time interval during which these pulses are counted. The actual flowmeter flow rate, Q, is inferred from the calibrator flow rate, which is proportional to the number of pulses registered by counter 32 divided by the time interval during which the pulses are counted. If the fluid is a gas, temperature and pressure probes represented by a block 36, sense the temperature and pressure at flowmeter 22 and generate temperature and pressure representative signals that are transmitted to computer 12 via a connection 42. Temperature and pressure probes 36 permit computer 12 to correct the inferred flowmeter flow rate for temperature and pressure. The K-factor sample expressed in pulses per liter (liquid) or actual cubic meter (gas) is derived by dividing the meter frequency, F, by the meter flow rate, Q.

As piston 16 travels from the upstream end of cylinder 18 to the downstream end thereof during a single test run, K-factor samples for up to ten or more time intervals are calculated in computer 12. Each such K-factor sample is compared in computer 12 with the previous sample and, in the preferred embodiment, a K-factor sample is deemed to be a valid K-factor data point when the maximum difference between said sample and the previous sample is less than a predetermined percentage, e.g. 0.1%. One valid data point is so derived during each test run—it is preferably the first sample that differs from the previous sample by less than the predetermined percentage. During different test runs, K-factor data points are generated for different flow rates and, in the case of a gas, different pressures. As described in U.S. Pat. No. 4,627,267 , the flow rate is changed by resetting piston actuator 24 to drive piston 16 at different speed and the gas pressure is changed by recharging calibrator to a different gas pressure. The K-factor data points are stored in computer 12 for later display and use. At the end of each test run, the computer 12 determines when piston 16 has reached the downstream end of cylinder 18 by the count registered by counter 32. Computer 12 then actuates a return valve 44 (FIG. 3 of referenced patent via an electrical connection 46 and piston actuator 24 via connection 30 to return piston 16 to the upstream end of cylinder 18. When the piston has returned to the upstream end of cylinder 18, calibrator 10 is ready to make another test run and a signal is given by return valve 44 to computer 12 via an electrical connection 48. Thereupon, computer 12 sends out another start command to piston actuator 24 and the procedure is repeated with a different set of variables. Computer 12 repeatedly continues to initiate further test runs until the K-factor data points corresponding to all the prescribed variables have been calculated.

The preferred embodiment of the invention is practiced under the control of an IBM personal computer programmed in the Pascal language. Use of this program, particularly as it relates to the calibration of gas flowmeters, is described in the applicant's "Gas Calibrator Console/Functional Specification," available from Calibron Systems, Inc., 4250 East Broadway Road, Phoenix, Ariz. 85036, U.S.A. The screens generated by the program are described in the Specification.

Specific reference is made to the "Take Data Points" Screen in the Specification. By entry of the number of pulses through a computer keyboard for the "MIN flowmeter count," the time interval over which the K-factor samples are calculated can be changed. By entry of a percentage through the computer keyboard for the "MAX difference between samples," the predetermined percentage that determines a valid data point can be changed. A number of data points at different flow rates can be calculated by a single command from the operator. In such case, the operator defines the range and the number of data points by inputting data to "Highest flow rate," "Lowest flow rate," and "Number of data point in range."

To speed up the collection of data an end of travel piston sensor can be provided and the program can ascertain if it is still possible to take a data point when the piston reaches the sensor—if not, the piston is immediately returned to the start position (upstream) instead of continuing downstream.

Although the time intervals in the described embodiment are determined by the number of flowmeter pulses registered by counter 34 and the same number of pulses is used to determine all the time intervals of a given test run, the time intervals could be determined differently. The important consideration is that the time interval during which the flowmeter pulses are counted preferably coincides in time with the interval during which the piston position is sensed. This insures that the flow rate through the flowmeter under test can be accurately inferred by the response of the piston position sensor. To the extent that less than maximum accuracy can be tolerated, the time intervals could deviate from coincidence.

The time intervals during which the K-factor samples are calculated could be determined in a number of different ways. For example, instead of determining the response of the flowmeter under test and the piston position sensor by means of counters as shown, these responses could be recorded on magnetic disk or tape so as to retain the relative time relationship between pulses. Two relatively small time intervals could be defined, i.e., 1,000 flowmeter pulses starting with the very first flowmeter pulse generated at the upstream end of the measuring cylinder. samples for each of these time intervals could be calculated and compared. Then the same calculation and comparison could be undertaken for successive overlapping intervals beginning with the second pulse generated by the flowmeter under test and the process could be repeated for successive overlapping intervals beginning with each successive flow-meter pulse until the comparison results in a maximum difference between samples less than the predetermined percentage. In this way, it can be determined when the flowmeter is up to full speed. To calculate the data point, a new larger time interval is selected which spans the portion of the piston travel from a position at the beginning of the last of the successive overlapping intervals to a position near the downstream end of the measuring cylinder. In this way, short time intervals can be employed to ascertain where valid data point information is available and then a large time interval can be selected to acquire the data for calculating the K-factor.

Alternatively, two test runs under identical conditions could be made using counters as shown to generate each data point. During the first test run, short intervals are used, e.g., 1000 flowmeter pulses, to determine by comparison of samples as described above where in the piston downstream travel the measuring piston reaches full speed. During the second test run, a single interval, as long as possible, is selected, e.g., 5,000 flowmeter pulses, beginning at the point in the piston downstream travel where the first test run determined the piston is at full speed.

The described embodiment of the invention is only considered to be preferred and illustrative of the inventive concept; the scope of the invention is not to be restricted by such embodiment. For example, although the invention is described in connection with a closed loop calibrator, it can be practiced with an open loop calibrator such as shown in U.S. Pat. No. 3,403,544 or with a prover such as shown in U.S. Pat. No. 4,152,922. Furthermore, the time intervals could be determined by the piston displacement or elapsed time rather than the number of flowmeter pulses. Although the time intervals during which the K-factor data are acquired are disclosed as being equal, they could be of varying duration or the intervals could overlap. Most advantageously, the intervals would be of short duration at the start of piston travel and become longer as the piston travels downstream. Further, the invention could be practiced with double chronometry if desired.

Attached hereto as Appendix A, available in microfiche, is a source code listing of a computer program for carrying out the invention.

We claim:

1. A method for determining the K-factor of a flowmeter, the method comprising the steps of:
    driving a movable fluid barrier from an upstream position toward a downstream position through a conduit connected fluidically in series with the flowmeter to induce fluid flow through the flowmeter at a flow rate related to the movement of the barrier;
    sensing the response of the flowmeter during a plurality of time intervals as the barrier is driven through the conduit from the upstream position toward the downstream position;
    sensing the movement of the barrier during said intervals;

determining from the flowmeter response and the barrier movement a K-factor sample for each interval; and comparing the K-factor samples to select a valid K-factor data point when the maximum difference between successive K-factor data samples is less than a predetermined percentage.

2. The method of claim 1, in which the flowmeter response is in the form of pulses and the time interval is determined by a number of flowmeter pulses.

3. The method of claim 2, additionally comprising measuring the time elapsed during each time interval and determining the K-factor samples from the measured elapsed times in addition to the flowmeter response and the barrier movement.

* * * * *